US010943360B1

(12) United States Patent
Crozier et al.

(10) Patent No.: US 10,943,360 B1
(45) Date of Patent: Mar. 9, 2021

(54) PHOTOGRAMMETRIC MACHINE MEASURE UP

(71) Applicant: Trimble Inc., Sunnyvale, CA (US)

(72) Inventors: Scott Crozier, Westminster, CO (US); John Boss, Denver, CO (US); Jon McKendry, Denver, CO (US); Adam Clare, Broomfield, CO (US)

(73) Assignee: Trimble Inc., Sunnyvale, CA (US)

( * ) Notice: Subject to any disclaimer, the term of this patent is extended or adjusted under 35 U.S.C. 154(b) by 0 days.

(21) Appl. No.: 16/662,851

(22) Filed: Oct. 24, 2019

(51) Int. Cl.
G06T 7/62 (2017.01)
G06T 7/80 (2017.01)
G06T 5/00 (2006.01)
E02F 9/26 (2006.01)
G01C 11/02 (2006.01)
E02F 3/32 (2006.01)
H04N 5/232 (2006.01)

(52) U.S. Cl.
CPC ............... G06T 7/62 (2017.01); E02F 3/32 (2013.01); E02F 9/264 (2013.01); G01C 11/02 (2013.01); G06T 5/006 (2013.01); G06T 7/80 (2017.01); H04N 5/23299 (2018.08)

(58) Field of Classification Search
None
See application file for complete search history.

(56) References Cited

U.S. PATENT DOCUMENTS 5,077,557 A 12/1991 Ingensand
5,432,712 A 7/1995 Chan
5,549,412 A 8/1996 Malone
5,642,285 A 6/1997 Woo et al.
5,929,807 A 7/1999 Viney et al.
6,034,722 A 3/2000 Viney et al.
(Continued)

FOREIGN PATENT DOCUMENTS

CN 10763658 6/2010
DE 19922321 7/2002
(Continued)

OTHER PUBLICATIONS

U.S. Appl. No. 13/332,648; Non-Final Office Action dated Dec. 5, 2014; 83 pages.
(Continued)

Primary Examiner — Chikaodili E Anyikire
(74) Attorney, Agent, or Firm — Adsero IP

(57) ABSTRACT

Various embodiments provide novel tools and techniques for photogrammetric machine measure-up, including without limitation solutions that can be used for excavation and similar applications. A system includes a machine, a user device may further comprise an image sensor, an accelerometer, a processor, and a computer readable medium in communication with the processor, the computer readable medium having encoded thereon a set of instructions executable by the processor to photogrammetrically measure-up the machine. Photogrammetric measure-up includes capturing, via the image sensor, two or more target images of each of the two or more targets, the two or more target images including a first target image and a second target image, and determining a measurement between two of the two or more reference features of the machine based on a first target image and second target image.

20 Claims, 9 Drawing Sheets

(56) References Cited

U.S. PATENT DOCUMENTS

| | | |
|---|---|---|
| 6,084,510 A | 7/2000 | Lemelson et al. |
| 6,144,308 A | 11/2000 | Dunne |
| 6,147,598 A | 11/2000 | Murphy et al. |
| 6,237,235 B1 | 5/2001 | Kaschke et al. |
| 6,282,362 B1 | 8/2001 | Murphy et al. |
| 6,463,374 B1 | 10/2002 | Keller et al. |
| 6,859,269 B2 | 2/2005 | Ohtomo et al. |
| 6,873,407 B2 | 3/2005 | Vogel |
| 7,145,648 B2 | 12/2006 | Vogel |
| 7,149,366 B1 | 12/2006 | Sun |
| 7,184,072 B1 | 2/2007 | Loewen et al. |
| 7,339,611 B2 | 3/2008 | Marold et al. |
| 7,374,140 B2 | 5/2008 | Crain et al. |
| 7,526,384 B2 | 4/2009 | MacIntosh et al. |
| 7,541,974 B2 | 6/2009 | Scherzinger |
| 7,543,780 B1 | 6/2009 | Marshall et al. |
| 7,611,105 B1 | 11/2009 | Carazo |
| 7,619,561 B2 | 11/2009 | Scherzinger |
| 7,646,339 B2 | 1/2010 | Green et al. |
| 7,697,127 B2 | 4/2010 | Glimm et al. |
| 7,719,467 B2 | 5/2010 | Norda et al. |
| 7,940,211 B2 | 5/2011 | Scherzinger |
| 7,978,128 B2 | 7/2011 | Scherzinger |
| 7,991,575 B2 | 8/2011 | Vogel et al. |
| 8,024,144 B2 | 9/2011 | Kludas et al. |
| 8,045,762 B2 | 10/2011 | Otani et al. |
| 8,125,379 B2 | 2/2012 | Allison |
| 8,229,166 B2 | 7/2012 | Teng et al. |
| 8,285,512 B2 | 10/2012 | Vogel et al. |
| 8,348,166 B2 | 1/2013 | Hanson |
| 8,416,130 B2 | 4/2013 | Scherzinger |
| 8,427,632 B1 | 4/2013 | Nash et al. |
| 8,625,086 B2 | 1/2014 | Vogel et al. |
| 8,629,905 B2 | 1/2014 | Svanholm |
| 8,633,588 B2 | 1/2014 | Lin et al. |
| 8,754,805 B2 | 6/2014 | Wang et al. |
| 8,897,482 B2 | 11/2014 | Mein et al. |
| 8,994,822 B2 | 3/2015 | Smitherman et al. |
| 9,182,229 B2 | 11/2015 | Grasser et al. |
| 9,235,763 B2 | 1/2016 | Joyce et al. |
| 9,247,239 B2 | 1/2016 | He et al. |
| 9,354,045 B1 | 5/2016 | Best |
| 9,879,993 B2 | 1/2018 | McFadden et al. |
| 10,168,153 B2 | 1/2019 | Grasser et al. |
| 10,301,798 B2 * | 5/2019 | France .................. E02F 9/262 |
| 10,458,099 B2 * | 10/2019 | Taylor ................... G01S 15/46 |
| 10,586,349 B2 * | 3/2020 | Li ........................ G06K 9/6201 |
| 2002/0001406 A1 | 1/2002 | Kochi et al. |
| 2002/0012071 A1 | 1/2002 | Sun |
| 2003/0137449 A1 | 7/2003 | Vashisth et al. |
| 2003/0218540 A1 | 11/2003 | Cooper et al. |
| 2004/0105090 A1 | 6/2004 | Schultz et al. |
| 2004/0228517 A1 | 11/2004 | Massen |
| 2005/0025313 A1 | 2/2005 | Watchel et al. |
| 2005/0031197 A1 | 2/2005 | Knopp |
| 2005/0057745 A1 | 3/2005 | Bontje |
| 2005/0069195 A1 | 3/2005 | Uezono et al. |
| 2005/0125142 A1 | 6/2005 | Yamane |
| 2006/0017938 A1 | 1/2006 | Ohtomo et al. |
| 2006/0195254 A1 | 8/2006 | Ladetto et al. |
| 2007/0058046 A1 | 3/2007 | Kagei |
| 2007/0070233 A1 | 3/2007 | Patterson |
| 2007/0133012 A1 | 6/2007 | Euler |
| 2007/0188601 A1 | 8/2007 | Rohaly et al. |
| 2007/0247457 A1 | 10/2007 | Gustafsson et al. |
| 2007/0297696 A1 | 12/2007 | Hamza et al. |
| 2009/0074254 A1 | 3/2009 | Jamison et al. |
| 2009/0154793 A1 | 6/2009 | Shin et al. |
| 2009/0220144 A1 | 9/2009 | Mein et al. |
| 2009/0225161 A1 | 9/2009 | Otani et al. |
| 2009/0231574 A1 | 9/2009 | Vogel et al. |
| 2009/0262974 A1 | 10/2009 | Lithopolous |
| 2009/0267827 A1 | 10/2009 | Allison |
| 2010/0013927 A1 | 1/2010 | Nixon |
| 2010/0118116 A1 | 5/2010 | Tomasz et al. |
| 2010/0157283 A1 | 6/2010 | Kirk et al. |
| 2010/0168949 A1 | 7/2010 | Malecki et al. |
| 2010/0172546 A1 | 7/2010 | Sharp |
| 2010/0174507 A1 | 7/2010 | Vogel et al. |
| 2010/0215212 A1 | 8/2010 | Flakes, Jr. |
| 2010/0228418 A1 | 9/2010 | Whitlow et al. |
| 2010/0289642 A1 | 11/2010 | Harrison |
| 2010/0305857 A1 | 12/2010 | Byrne et al. |
| 2010/0309311 A1 | 12/2010 | Svanholm |
| 2010/0322482 A1 | 12/2010 | Kochi |
| 2011/0007154 A1 | 1/2011 | Vogel et al. |
| 2011/0064312 A1 | 3/2011 | Janky et al. |
| 2011/0075886 A1 | 3/2011 | Ashjaee et al. |
| 2011/0090337 A1 | 4/2011 | Klomp et al. |
| 2011/0158475 A1 | 6/2011 | Otani et al. |
| 2011/0164108 A1 | 7/2011 | Bates et al. |
| 2011/0282578 A1 | 11/2011 | Miksa et al. |
| 2011/0285587 A1 | 11/2011 | Vollath et al. |
| 2011/0290937 A1 | 12/2011 | Salkeld |
| 2012/0026322 A1 | 2/2012 | Malka et al. |
| 2012/0029732 A1 | 2/2012 | Meyer |
| 2012/0093394 A1 | 4/2012 | Li |
| 2012/0154584 A1 | 6/2012 | Omer et al. |
| 2012/0155747 A1 | 6/2012 | Hwang |
| 2012/0163656 A1 | 6/2012 | Wang et al. |
| 2012/0237083 A1 | 9/2012 | Lange et al. |
| 2012/0274775 A1 | 11/2012 | Reiffel |
| 2012/0314068 A1 | 12/2012 | Schultz |
| 2012/0326923 A1 | 12/2012 | Oehler et al. |
| 2012/0330601 A1 | 12/2012 | Soubra et al. |
| 2013/0021475 A1 | 1/2013 | Canant et al. |
| 2013/0161810 A1 | 6/2013 | Lin et al. |
| 2013/0228645 A1 | 9/2013 | Van Speybroeck et al. |
| 2013/0253822 A1 | 9/2013 | Fortune et al. |
| 2013/0298083 A1 | 11/2013 | Bertoldo et al. |
| 2014/0019179 A1 | 1/2014 | Gosalvez et al. |
| 2014/0081571 A1 | 3/2014 | Briggs et al. |
| 2014/0091481 A1 | 4/2014 | Lin et al. |
| 2014/0156219 A1 | 6/2014 | Soubra et al. |
| 2014/0195150 A1 | 7/2014 | Rios |
| 2014/0200863 A1 | 7/2014 | Kamat et al. |
| 2014/0222246 A1 | 8/2014 | Mohamadi |
| 2014/0277956 A1 * | 9/2014 | Morin .................. G01C 21/165 |
| | | 701/50 |
| 2015/0036888 A1 | 2/2015 | Weisenburger |
| 2015/0225923 A1 * | 8/2015 | Wallace ............... G01C 15/002 |
| | | 701/50 |
| 2015/0227775 A1 | 8/2015 | Lewis et al. |
| 2015/0243019 A1 * | 8/2015 | Hall ......................... G06T 7/70 |
| | | 348/95 |
| 2015/0268043 A1 | 9/2015 | McFadden et al. |
| 2015/0276402 A1 | 10/2015 | Grasser et al. |
| 2016/0116280 A1 | 4/2016 | Joyce et al. |
| 2016/0237640 A1 | 8/2016 | Carpenter ............. E02F 9/2841 |
| 2017/0221226 A1 | 8/2017 | Shen et al. |
| 2017/0287166 A1 * | 10/2017 | Claveau ................ H04N 17/002 |
| 2019/0066323 A1 | 2/2019 | Li et al. |

FOREIGN PATENT DOCUMENTS

| | | |
|---|---|---|
| EP | 391498 | 10/1990 |
| EP | 1944572 | 7/2008 |
| EP | 1936323 | 3/2010 |
| EP | 1931945 | 4/2011 |
| EP | 2923173 | 9/2015 |
| JP | 2014-062387 | 4/2014 |
| WO | WO-1991-019265 | 12/1991 |
| WO | WO-2009-100728 | 8/2009 |
| WO | WO-2009-100773 | 8/2009 |
| WO | WO-2009-100774 | 8/2009 |
| WO | WO-2009-103342 | 8/2009 |
| WO | WO-2009-106141 | 9/2009 |
| WO | WO-2010-080950 | 7/2010 |
| WO | WO-2011-005783 | 1/2011 |
| WO | WO-2011-088509 | 7/2011 |
| WO | WO-2011-093751 | 8/2011 |
| WO | WO-2011-131382 | 10/2011 |
| WO | WO-2012-088413 | 6/2012 |
| WO | WO-2014-055428 | 4/2014 |

(56) References Cited

FOREIGN PATENT DOCUMENTS

| WO | WO-2014-055430 | 4/2014 |
| WO | WO-2014-081535 | 5/2014 |
| WO | WO-2014-138951 | 9/2014 |
| WO | WO-2014-205277 | 12/2014 |
| WO | WO-2016-032901 | 3/2016 |

OTHER PUBLICATIONS

U.S. Appl. No. 13/332,648; Notice of Allowance dated Jul. 7, 2015; 44 pages.
International Preliminary Report on Patentability (IPRP) prepared by the International Bureau for PCT International Patent Application No. PCT/US11/66839, dated Jul. 4, 2013; 6 pages.
International Search Report and Written Opinion prepared by the U.S. Patent and Trademark Office as International Searching Authority for PCT International Patent Application No. PCT/US11/66839, dated Mar. 12, 2012; 12 pages.
Extended European Search Report for EP-21064568, dated Oct. 17, 2017; 6 pages.
Communication pursuant to Article94-3 EPC, dated Jan. 17, 2019, 6 pages.
International Preliminary Report on Patentability (IPRP) prepared by the International Bureau for PCT International Patent Application No. PCT/US13/62674, dated Jun. 18, 2015; 10 pages.
International Search Report and Written Opinion prepared by the U.S. Patent and Trademark Office as International Searching Authority for PCT International Patent Application No. PCT/US13/62674, dated Mar. 10, 2014; 18 pages.
U.S. Appl. No. 14/433,330; NonFinal Office Action dated Oct. 5, 2017; 44 pages.
U.S. Appl. No. 14/433,330; Final Office Action dated May 15, 2018; 42 pages.
U.S. Appl. No. 14/433,330; Notice of Allowance dated Sep. 28, 2018; 20 pages.
International Preliminary Report on Patentability (IPRP) prepared by the International Bureau for PCT International Patent Application No. PCT/US13/62679; dated Apr. 16, 2015; 8 pages.
International Search Report and Written Opinion prepared by the U.S. Patent and Trademark Office as International Searching Authority for PCT International Patent Application No. PCT/US13/62679, dated Mar. 28, 2014; 16 pages.
Nasvik, "Site Layout with Robotic Total Stations", Dec. 2003 [retrieved on Jan. 25, 2014]. Retrieved from the Internet:<URL:http://www.concreteconstruction.net/Images/Site%20Layout%20with%20Robotic%20Total%20Stations_tcm45-590322.pdf> p. 3, paragraph [0000].
Communication pursuant to Article94-3 EPC, dated Dec. 12, 2018, 5 pages.
Tahar et al. "UAV-Based Stereo Vision for Photogrammetric Survey in Aerial Terrain Mapping," 2011 International Computer Applications and Industrial Electronics (ICCAIE 2011), Dec. 4, 2011, pp. 443-447.
U.S. Appl. No. 13/685,375; NonFinal Office Action dated Aug. 3, 2015; 20 pages.
U.S. Appl. No. 13/685,375; Notice of Allowance dated Sep. 3, 2015; 10 pages.
International Preliminary Report on Patentability (IPRP) prepared by the International Bureau for PCT International Patent Application No. PCT/US13/67115, dated Jun. 4, 2015; 9 pages.
International Search Report and Written Opinion prepared by the European Patent Office as International Searching Authority for PCT International Patent Application No. PCT/US13/67115, dated Jan. 27, 2014, 14 pages.
EP Application No. 13789137.0 Communication pursuant to Article94-3 EPC, dated Jan. 31, 2019, 9 pages.
EP Application No. 13789137.0 Communication pursuant to Article94-3 EPC, dated Jun. 27, 2019, 7 pages.
U.S. Appl. No. 14/958,534; NonFinal Office Action, dated Mar. 8, 2018, 46 pages.
U.S. Appl. No. 14/958,534; Final Office Action, dated Sep. 14, 2018, 40 pages.
U.S. Appl. No. 14/958,534; NonFinal Office Action, dated Jan. 11, 2019, 41 pages.
U.S. Appl. No. 14/958,534; Final Office Action, dated Jun. 19, 2019, 45 pages.
U.S. Appl. No. 14/958,534; NonFinal Office Action, dated Nov. 19, 2019, 43 pages.
U.S. Appl. No. 13/922,772; NonFinal Office Action dated May 28, 2015; 37 pages.
U.S. Appl. No. 13/922,772; Notice of Allowance dated Sep. 21, 2015; 20 pages.
International Search Report and Written Opinion prepared by the European Patent Office as International Searching Authority for PCT International Patent Application No. PCT/US14/43271, dated Sep. 22, 2014, 9 pages.
International Preliminary Report on Patentability (IPRP) prepared by the International Bureau for PCT International Patent Application No. PCT/US14/43721, dated Dec. 30, 2015; 6 pages.
U.S. Appl. No. 15/685,617, NonFinal Office Action dated May 2, 2019; 355 pages.
Extended European Search Report for EP-21099510, dated Feb. 4, 2019, 10 pages.
Elphel, Inc. (2011) Elphel-Eyesis 4π http://www3.elphel.com/eyesis-4pi, accessed on: Feb. 29, 2012, 4 pages.
Elphel, Inc. (2011) Imaging solutions with Free software and open hardware, www3.elphel.com accessed on Mar. 1, 2012, 2 pages.
Elphel, Inc. (Mar. 10, 2010) Elphel Development Blog first Elphel Eyesis Prototype assembled, www.elphel.com accessed on Mar. 1, 2012, 7 pages.
Elphel, Inc. (Nov. 12, 2011) Elphel-Eyesis 4π Brochure, www.elphel.com accessed on Feb. 29, 2012, 12 pages.
Feng, Chen (2015) "Camera Marker Networks for Pose Estimation and Scene Understanding in Construction Automation and Robotics", 233 pages.
Akula, Manu et al. (2011) Integration of infrastructure based positioning system and inertial navigational for ubiquitous context-aware engineering applications, 16 pages.
U.S. Appl. No. 15/685,617, Notice of Allowance, dated Oct. 18, 2019; 67 pages.
Lundeen et al., (2015) "Optical marker-based end effector pose estimation for articulated excavators", 14 pages.
U.S. Appl. No. 14/958,534; Final Office Action, dated May 11, 2020, 51 pages.
U.S. Appl. No. 14/958,534; Non-Final Office Action, dated Sep. 30, 2020, 54 pages.

* cited by examiner

US 10,943,360 B1

PHOTOGRAMMETRIC MACHINE MEASURE UP

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to machine commissioning and measure-up, and more particularly, to novel tools and techniques for performing machine measure-up photogrammetrically.

BACKGROUND

Equipment commissioning is a process of ensuring a machine and any associated sensors have been installed correctly and function within desired operational requirements. Equipment commissioning may further include calibration of various control systems of the machine. Typically, software used for commissioning relies on a measurement of the dimensions of the machine.

An excavator can include one or more body sensors, such as an inertial measurement unit, accelerometer, a position sensor (e.g., global navigation satellite system (GNSS) receiver), pressure sensors (e.g., hydraulic sensors), or the like. With an excavator, physical dimensions are typically measured manually, using a tape measure, or by using systems such as a total station or a stereographic imaging system to aid in the measurement process. The dimensions of the boom, stick, and/or bucket may be measured. It is often difficult and time consuming for an operator of an excavator to accurately measure-up the dimensions of an excavator manually. Systems such as a total station or stereographic imaging systems require specialized equipment that adds to the cost and complexity of the measure-up process.

Accordingly, tools and techniques for photogrammetric machine measure-up are provided.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
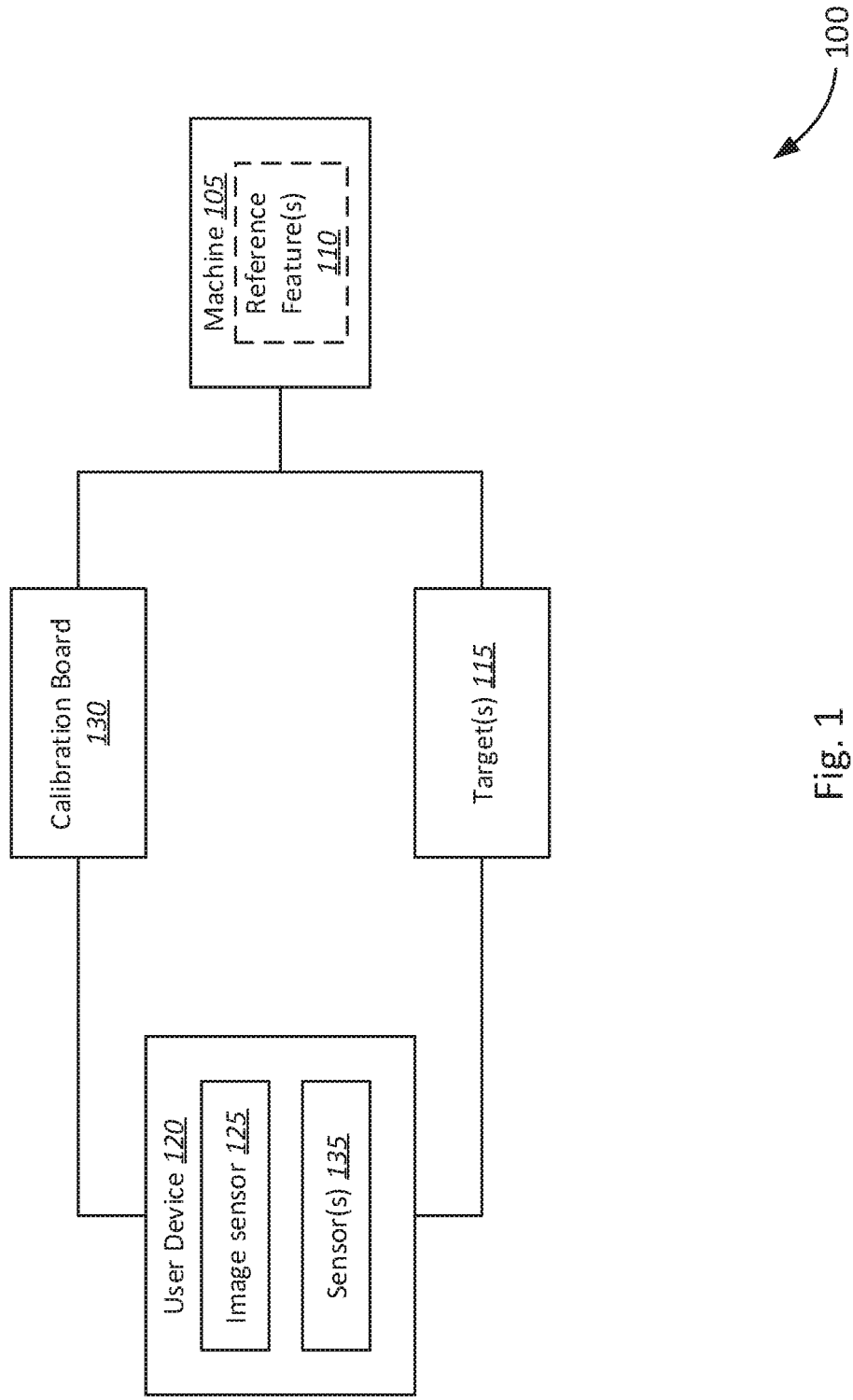
FIG. 1 is a schematic block diagram of a photogrammetric machine measure-up system, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a system for photogrammetric machine measure-up is provided. The system includes a machine comprising two or more reference features, two or more targets coupled to the two or more reference features, a calibration board coupled to the machine, and a user device. The user device further includes an image sensor, an accelerometer, a processor, a computer readable medium in communication with the processor, the computer readable medium having encoded thereon a set of instructions executable by the processor to cause the user device to capture, via the image sensor, one or more calibration images of the calibration board and calibrate the image sensor based on the one or more calibration images, wherein calibrating the image sensor includes determining at least one camera calibration parameter. The instructions may be further executable by the processor to capture, via the image sensor, two or more target images of each of the two or more targets, associate each of the two or more target images with a respective time stamp when each respective target image of the two or more images was taken, and associate each of the two or more target images with respective accelerometer data from when each respective target image of the two or more images was taken. The instructions may further be executed to undistort each of the two or more target images based on the at least one camera calibration parameter, detect each of the two or more targets in a first target image of the two or more target images, detect each of the two or more targets in a second target image of the two or more target images, and determine a measurement between two of the two or more reference features of the machine based on the first target image and second target image.

In another aspect, an apparatus for photogrammetric machine measure-up is provided. The apparatus includes a processor, and a computer readable medium in communication with the processor, the computer readable medium having encoded thereon a set of instructions executable by the processor to capture, via an image sensor, one or more calibration images of a calibration board, and calibrate the image sensor based on the one or more calibration images, wherein calibrating the image sensor includes determining at least one camera calibration parameter. The instructions may further be executed by the processor to capture, via the image sensor, two or more target images of each of two or more targets, associate each of the two or more target images with a respective time stamp when each respective target image of the two or more images was taken, and associate each of the two or more target images with respective accelerometer data from when each respective target image of the two or more images was taken. The instructions may further be executed by the processor to undistort each of the two or more target images based on the at least one camera calibration parameter, detect each of the two or more targets in a first target image of the two or more target images, detect each of the two or more targets in a second target image of the two or more target images, and determine a measurement between two of two or more reference features of a machine based on the first target image and second target image.

In a further aspect, a method for photogrammetric machine measure-up is provided. The method includes capturing, via an image sensor, one or more calibration images of a calibration board, and calibrating the image sensor based on the one or more calibration images, wherein calibrating the image sensor includes determining at least one camera calibration parameter. The method further includes capturing, via the image sensor, two or more target images of each of two or more targets, associating each of the two or more target images with a respective time stamp when each respective target image of the two or more images was taken, and associating each of the two or more target images with respective accelerometer data from when each respective target image of the two or more images was taken. The method continues by undistorting each of the two or more target images based on the at least one camera calibration parameter, detecting each of the two or more targets in a first target image of the two or more target images, detecting each of the two or more targets in a second target image of the two or more target images, and determining a measurement between two of two or more reference features of a machine based on the first target image and second target image.

FIG. 1 is a schematic block diagram of photogrammetric machine measure-up system 100, in accordance with various embodiments. The system 100 includes a machine 105, one or more targets 115, calibration board 130, user device 120 including image sensor 125. The machine 105 may further optionally include one or more reference features 110. It should be noted that the various components of the system 100 are schematically illustrated in FIG. 1, and that modifications to the system 100 may be possible in accordance with various embodiments.

In various embodiments, the one or more targets 115 and calibration board 130 may be coupled to the machine 120 at respective locations. In some embodiments, the machine 105 may include one or more reference features 110. The each of the one or more targets 115 may be coupled to the one or more pins 110, respectively. The user device 120 may further be coupled to or otherwise arranged to capture images of the one or more targets 115 and calibration board 130.

In various embodiments, the machine 105 may include various types of heavy machinery. For example, in some embodiments, the machine 105 may include, without limitation, an excavator, crane, backhoe, bulldozer, or other construction equipment. In some embodiments, the machine 105 may include any heavy machinery including one or more of a boom, stick, and working attachment. Examples of working attachments include, without limitation, a blade, hook, bucket, or other suitable tool as known to those skilled in the art. In some embodiments, the machine 105 may include one or more reference features 110, to which a respective target of the one or more targets 115 may be coupled. The one or more reference features 110, for example, may include linkage pins of the machine 105. In some embodiments, the one or more reference features 110 may include one or more pins configured to couple, for example, the boom to the cabin, the stick to the boom, and the working attachment to the stick.

In various embodiments, the one or more targets 115 may include optical targets, which may be captured via the image sensor 125. Optical targets may include, without limitation, boards, posters, pictures, printed images, prisms, discs, spheres, flags, and/or other target that may be optically captured by the user device 120.

In some embodiments, the one or more targets 115 may include optically encoded information. For example, the one or more targets 115 may include, without limitation, optically encoded information such as barcodes, patterns, shapes, characters such as numerals, letters, or both, and color coding. In some embodiments, the optically encoded information may include a respective identifier unique to each of the one or more targets 115. The encoded information may further include information identifying the machine, such as make and model information, work-site identification, and offset distance of the target.

As previously described, the one or more targets 115 may be configured to be coupled to the one or more reference features 110. In some embodiments, the one or more targets 115 may be coupled to the one or more reference features 110, for example, via a magnetic base. In further embodiments, the one or more targets 115 may be coupled to the one or more reference features via an adhesive layer, vacuum coupling (e.g., a suction cup), a screw coupling, or other suitable mechanical coupling. The one or more targets 115 may further include alignment markers to aid in the centering of a target to a respective reference feature of the one or more features 110. Alignment markers, for example, may include visual indicators such as crosshairs, lines, or other patterns. In some embodiments, the one or more targets 115 may further include a post separating the visual markings of the target (e.g., a printed image on a board, poster, paper, or other medium) from the mechanical coupling to the respective reference feature (e.g., the magnetic base, etc.). In some embodiments, the post may be an adjustable post configured to offset the visual markings of the target by a variable distance from the respective reference feature. In some embodiments, the one or more targets 115 may be configured to be offset from a respective reference feature 110 along at least one axis. The distance of an offset, accordingly, may include a length of an offset of the target from a respective reference feature 110. For example, in some embodiments, a first target of the one or more targets 115 may be offset a first offset distance from a first reference feature of the one or more reference features 110. A second target of the one or more targets 115 may be offset a second offset distance from the second reference feature of the one or more reference features 110. A third target of the one or more targets 115 may be offset a third offset distance from a third reference feature of the one or more reference features 110. A fourth target of the one or more targets 115 may be offset a fourth offset distance from a fourth reference feature of the one or more reference features 110. The first through fourth targets may be configured to respectively have a first through fourth offset distance such that the first through fourth targets all lie substantially in the same plane. In some embodiments, more than three targets may be utilized. Accordingly, each of the one or more targets 115 may be positioned within a threshold distance orthogonal to a plane defined by any three of the one or more targets 115.

In various embodiments, a calibration board 130 may also be coupled to the machine 105. The calibration board 130 may include one or more calibration indicators configured to calibrate an image sensor 125. Calibration indicators, for example, may include a checkered grid or other pattern, the visual characteristics of which are known. Like the target, the calibration board 130, may include a board, poster, picture, printed image, prism, disc, sphere, flag, and/or other target that may be optically captured by the user device 120. The calibration board 130 may be configured to allow the image sensor 125 to calibrate pixels in a captured image to real-world measurements.

The user device 120 may be configured to capture, via the image sensor 125, images of the one or more targets 115 and calibration board 130. The user device 120 may further be configured to execute logic, in the form of one or more executable instructions, to perform photogrammetric measure-up of the machine 105 based on images captured by the image sensor 125. Accordingly, the user device 120 may be a suitable device comprising the image sensor 125 and capable of executing the photogrammetric measure-up logic. For example, user device 120 may include, without limitation, a computer, laptop, tablet, smartphone, camera, or other suitable device. Accordingly, the image sensor 125 may include cameras, and corresponding lens assemblies configured to capture images of the one or more targets 115 and/or calibration board 130. The user device 120 may further include one or more sensors 135, such as an inertial measurement unit (IMU), an accelerometer (which may be part of the IMU), and/or gyroscope. The one or more sensors 135 may be configured to determine an orientation of the user device 120/image sensor 125, and a relative position of the user device 120/image sensor 125 as the user device 120 is moved. For example, a first orientation of the user device 120/image sensor 125 when a first image is captured may be determined, and a second orientation of the user device 120/image sensor 125 when a second image is captured may be determined. Furthermore, the distance between a first position when a first image is captured and a second position when a second image is captured may be determined based on IMU data (e.g., based on a second-order derivative of a series of IMU data). For example, IMU data may include accelerometer data, indicative movement (e.g., acceleration) of the IMU in at least three dimensions (e.g., along acceleration along an x-axis, y-axis, and z-axis). In some further embodiments, the one or more sensors 135 of the user device 120 may include a global navigation satellite system (GNSS) receiver, from which location information may be used to supplement a determination of relative positions and/or as an alternative to IMU data.

Figure 2A:
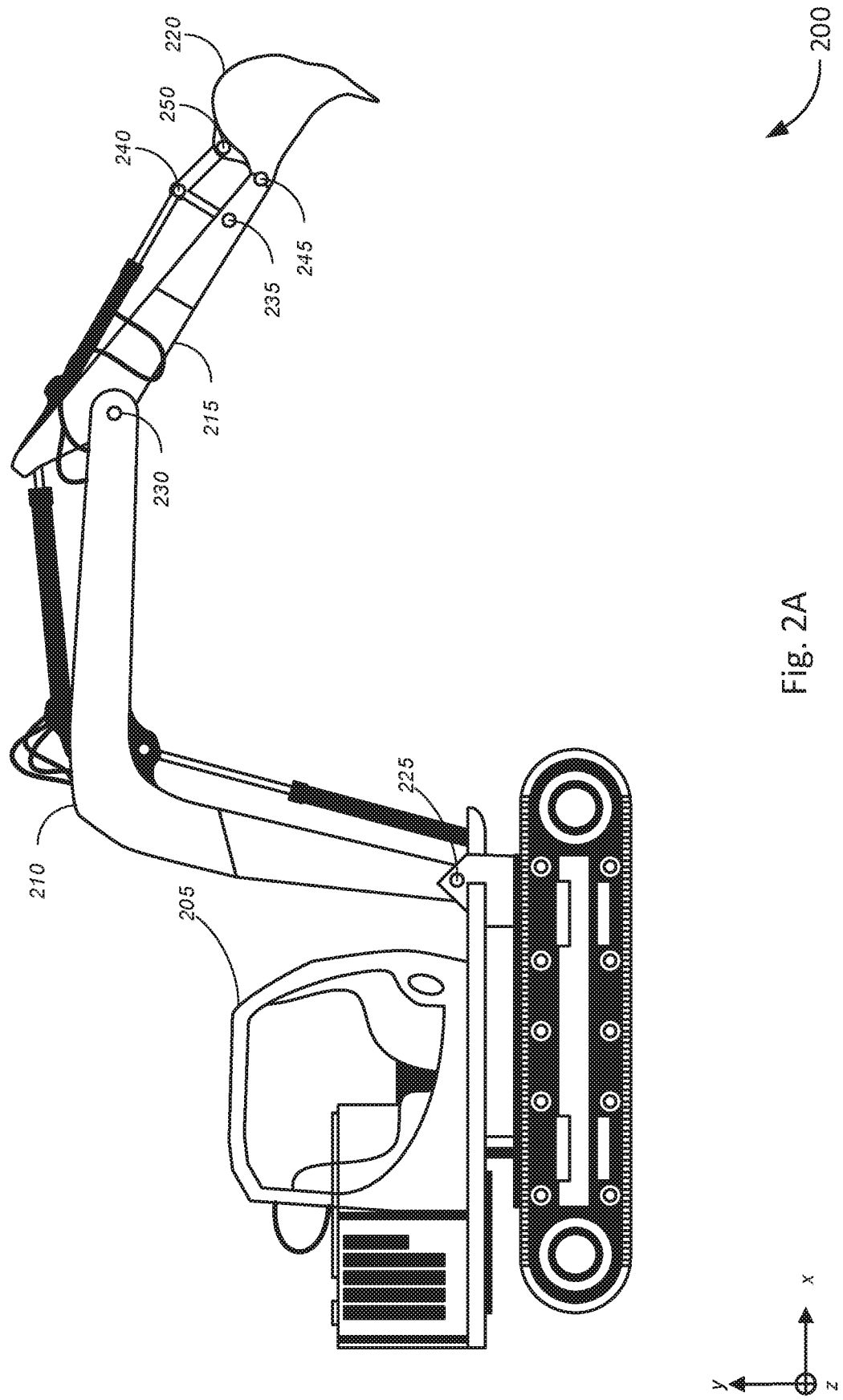
FIG. 2A is a schematic side elevation view of an excavator and pins, in accordance with various embodiments.

FIG. 2A is a schematic side elevation view of an excavator 200, in accordance with various embodiments. The excavator 200 includes a cabin 205, boom 210, stick 215, working attachment 220, and linkage pin A 225, linkage pin B 230, linkage pin D 235, linkage pin F 240, linkage pin G 245, and linkage pin H 250. It should be noted that the various components of the excavator 200 are schematically illustrated in FIG. 2A, and that modifications to the excavator 200 may be possible in accordance with various embodiments.

In various embodiments, the boom 210 may be coupled to the cabin 205 via linkage pin A 225. The stick 215 may be coupled to the boom 210 via linkage pin B 230. The working attachment 220 may be coupled to the stick via linkage pin G 245. The working attachment may further be coupled to a bucket link located between linkage pin H 250 and linkage pin F 240. Thus, the linkage pin H 250 links the working attachment 220 to the bucket link. The linkage pin F 240 couples to the bucket link to a tipping link. The tipping link is located between the linkage pin F 240 and linkage pin D 235. Thus, linkage pin F 240 couples the tipping link to the bucket link, and linkage pin D 235 couples the tipping link to the stick 215.

Figure 2B:
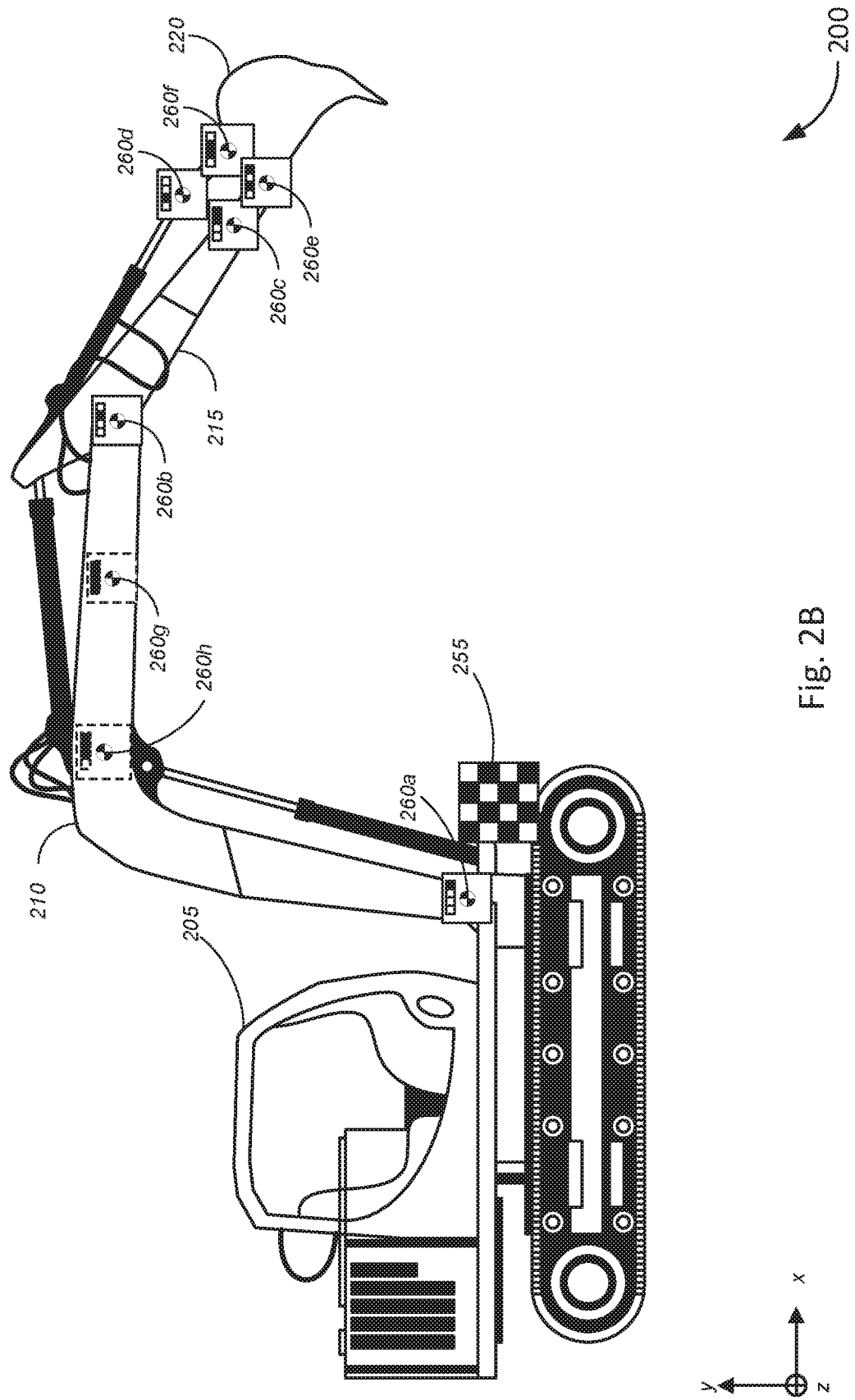
FIG. 2B is a schematic side elevation view of an excavator with targets and calibration board, in accordance with various embodiments.

As the machine, in this example, is an excavator 205, the working attachment 220 is a bucket. In this example, reference features used for measure-up may include pins A, B, D, F, G, and H 225-250, as illustrated in FIG. 2B. FIG. 2B is a schematic side elevation view of the excavator 200, with targets coupled to the excavator. Accordingly, the excavator 200 further includes a calibration board 255, and a first target 260a, second target 260b, third target 260c, fourth target 260d, fifth target 260e, and sixth target 260f. In some further embodiments, the excavator may optionally include a seventh target 260g and eighth target 260h. It should be noted that the various components of the excavator 200 are schematically illustrated in FIG. 2B, and that modifications to the excavator 200 may be possible in accordance with various embodiments.

In various embodiments, the first target 260a may be coupled to a first reference feature, in this example linkage pin A 225. The second target 260b may be coupled to linkage pin B 230. The third target 260c may be coupled to linkage pin D 236. The fourth target 260d may be coupled to linkage pin F 240. The fifth target 260e may be coupled to linkage pin G 245. The sixth target 260f may be coupled to linkage pin H 250. In some embodiments, the seventh target 260g and eighth target 260h may further be attached to the boom 210 of the excavator 200. For example, in some embodiments, the seventh target 260g may be configured to be coupled to one or more on-board sensors of the excavator. For example, on-board sensors may include an accelerometer, IMU, or other on-board sensors. The eighth target 260*h* may be coupled to an known position on the boom 210 of the excavator 210. For example, in some embodiments, the known position may correspond to an elbow of the boom 210, or alternatively the point at which two straight segments of the boom 210 may be joined.

Figure 3A:
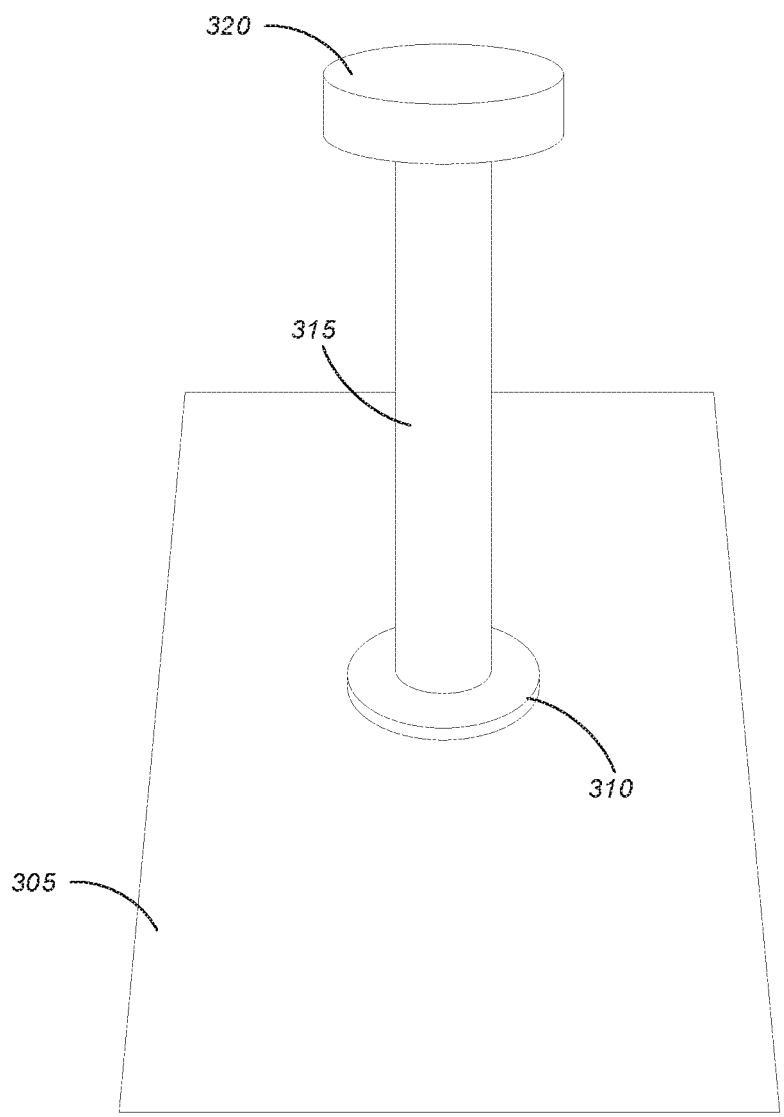
FIG. 3A is a perspective view of the rear of the target, in accordance with various embodiments.

In various embodiments, each of the targets 260*a*-260*h* may be configured to be coupled to the various linkage pins 225-250 of the excavator 200. FIG. 3A is a perspective view of the rear of the target 300A, in accordance with various embodiments. The target 300A includes target medium 305, backing plate 310, offset post 315, and coupling plate 320. It should be noted that the various components of the target 300A are schematically illustrated in FIG. 3A, and that modifications to the system 300A may be possible in accordance with various embodiments.

In various embodiments, the target medium 305 may be coupled to a backing plate 310. The backing plate 310 may, in turn, be configured to be coupled to the offset post 315. The offset post 315 may be coupled to the coupling plate 320, which may be configured to be coupled to various reference features and/or surfaces of the machine for measure-up.

As previously described, the target medium 305 may be a medium to which an image, pattern, and/or encoded information may be printed or otherwise displayed. Thus, the target medium 305 may include, without limitation, a board, poster, paper, or other suitable medium via which to provide a target graphic, such as a pattern or image. In some further embodiments, the target medium 305 may include, without limitation, an electronic display, light, prism, sphere, flag, which may be captured by an image sensor, as previously described.

In some embodiments, the backing plate 310 may be a plate coupled to the target medium 305 on one side, and the offset post 315 on an opposite side. Thus, the backing plate 310 may include, without limitation, a metal plate, magnetic plate, adhesive backing (e.g., an adhesive pad, adhesive tape, or an adhesive layer), or a mechanical coupling (e.g., a screw post, threaded hole, quick connection, vacuum/ suction coupling, etc.). Thus, the backing plate 310 may be coupled to the target medium 305 and offset post 315 via a magnetic coupling, adhesive coupling, or another mechanical coupling.

In some embodiments, the offset post 315 may be a post that is configured to offset the coupling plate 320 from the target medium 305 and backing plate 310. In some examples, the offset post 315 may be an adjustable post (e.g., telescoping post). The offset post 315 may include, on one or more ends, a coupling. The coupling may include, for example, a magnetic coupling, adhesive coupling, or other mechanical coupling, as described above with respect to the backing plate 310. Accordingly, the offset post 315 may be coupled to the backing plate 310 and coupling plate 320 via a magnetic coupling, adhesive coupling, or another mechanical coupling. For example, in some embodiments, the offset post 315 may be configured to be screwed to the backing plate 310 on one end, and the coupling plate 320 on the other end.

In some embodiments, the coupling plate 320 may be configured to couple the target 300A to the machine, for example, via a reference feature (e.g., a pin), or a surface of the machine. Accordingly, the coupling plate 320 may be a magnet coupling, adhesive coupling, or other mechanical coupling, as previously described. Accordingly, the coupling plate 320 may be coupled to the offset post 315, and to couple the target to the machine (e.g., a reference feature of the machine or a surface of the machine) magnetically, adhesively, or through a mechanical coupling.

Figure 3B:
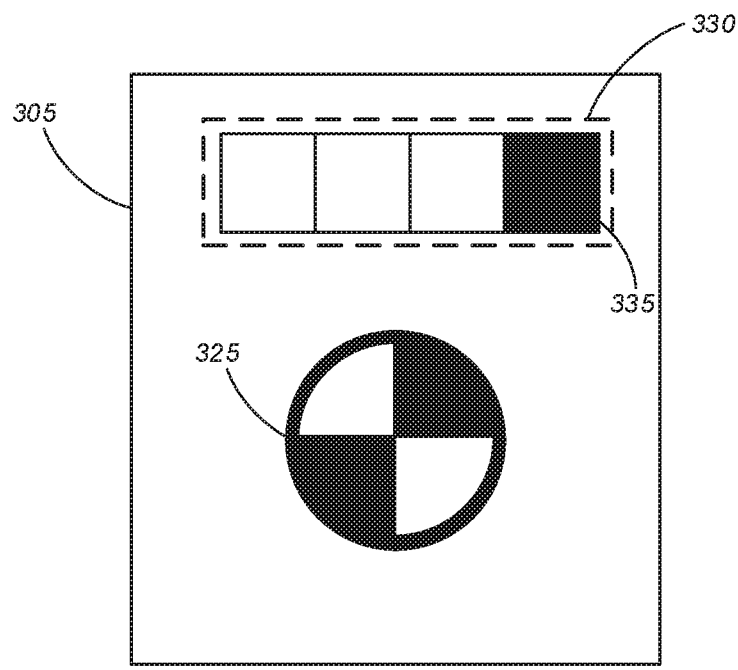
FIG. 3B is a front elevation view of the front of the target, in accordance with various embodiments.

FIG. 3B is a front elevation view of the front of the target 300B. In various embodiments, the target 300B may include a target medium 305. The target medium 305 may further comprise a target graphic 325, encoded information 330, and barcode 335. As shown in the example, the target 300B includes a target graphic 325, which is displayed on the target medium 305.

As previously described, the target medium 305 may include, without limitation, a board, poster, paper, or other suitable medium on which the target graphic 325 may be displayed. The target graphic 325 may, therefore, include an image, pattern, shape, or other visualization configured to be captured by the image sensor. In the example shown, the target graphic 325 is a crosshair formed within a circular shape, in which the quadrants of the circle are shaded in alternating black and white colors. Thus, in some embodiments, the target graphic 325 may be configured to allow the measure-up logic to determine a central point of the target graphic 325.

In some embodiments, the target 300B may include encoded information 330. As previously described, encoded information 330 may include, without limitation, barcodes, patterns, shapes, characters such as numerals, letters, or both, and color coding. As shown, the encoded information 330 may include a barcode 335. In some embodiments, the barcode 335 may include identifying information for the target 300B. As previously described, identifying information may include a respective identifier for the target 300B, information about the machine to which the target 300B is attached (such as make and model information), work site information, or a respective distance of an offset of the target 300B.

In operation, with reference to FIGS. 1-3B, a user of the system 100 may first place one or more targets 115, 260*a*-*h*, 300A, 300B at a respective one or more reference features 110. The one or more reference features 110 may include surfaces of the machine 105, 200 and/or one or more pins 225-250. The one or more pins 225-250 include pin A 225, pin B 230, pin D 235, pin F 240, pin G 245, and pin H 250, respectively. As previously described, each of the one or more targets 115, 260*a*-*h*, 300A, 300B may include a coupling plate 320. The coupling plate 320 may be configured to be coupled to the machine 105, 200 via a magnetic coupling, adhesive coupling, or mechanical coupling. In some embodiments, additional targets of the one or more targets 115 may be placed on the ground around the machine 105, 200 for additional reference points to increase accuracy of the measure-up. For example, the additional targets may be scattered between the body of the machine 105, 200 and a working attachment 220. In further embodiments, the calibration board 255 may be placed on the machine 105, 200, under the boom 210 or against the track of the machine 105, 200. In some embodiments, the calibration board 255 may be positioned such that a longitudinal edge of the calibration board 255 is substantially parallel (e.g., within 10 degrees of angular deviation) with a longitudinal axis of the boom 210.

With the one or more targets 115, 260*a*-*h*, 300A, 300B and calibration board 255 placed, the measure-up logic may be calibrated via the user device 120. In other embodiments, data (e.g., captured calibration board 130, 255 data and/or target 260*a*-*h* data) from the user device 120 may be transmitted, for example, to a remote server, which may be configured to execute the measure-up logic, as described below. For example, in some embodiments, the image sensor 125 may include a camera, which further includes one or more lenses. Thus, calibration may be performed to calibrate for lens distortion utilizing the calibration board 130, 255. For example, one or more images of the calibration board 130, 255 via the image sensor 125. As previously described, the user device 120 may include a mobile communication device, computer, laptop, tablet, smartphone, and/or the like. In some embodiments, the user device 120 may include a display that presents a view from the image sensor 125, which may include a camera assembly of the user device 120. The user device 120 may be positioned such that an image of the calibration board 130, 255 may be taken to fill a camera viewfinder or a designated area of the view from the image sensor 125 displayed by the user device 120. For example, the user device 120 and/or image sensor 125 may be positioned such that an image or image feed of the calibration board 130, 255, as captured by the image sensor 125, is positioned to fill a specified area, or an amount of the field of view (FOV) (e.g., a percentage of pixels or visible area of an FOV), of the image, viewfinder, or display. The measure-up logic and/or the user device 120 may then be configured to capture images of the calibration board 255 as the user device 120 is manipulated relative to the calibration board 130, 255. For example, in some embodiments, the user device 120 may be configured to capture images of the calibration board 130, 255 while the user moves the user device 120 to the left, right, above, and below the calibration board 130, 255. Images of the calibration board 130, 255 are then captured from an angle as the user device 120 is positioned relatively to the left, right, above, and below the calibration board 130, 255.

In some embodiments, open source computer vision (OpenCV) camera calibration may be performed to calibrate for camera distortion, as known to those skilled in the art, and explained below. Based on the calibration board 130, 255 and sub-pixel corner locations in the one or more images, the corners can be compared with the corresponding projective coordinates on the image plane computed from the camera projection model. By minimizing the sum of squared differences from comparison of corner location, the parameters in the camera projection model, including camera intrinsic, lens distortion and camera orientation with respect to the one or more targets 260a-260h, can be further refined.

Generally, this so-called pinhole camera projection model maps pixels in the image frame to a world reference frame with one-to-one correspondences in the camera centered frame by a 6 degrees of freedom ("dof") transform. It consists of a 3 dof translation defined as a 3 by 1 vector t, and a 3 dof rotation represented by a rotation matrix R. For a given target $[X, Y, Z]^T$, the following Eq. 1 transforms its coordinates in the world frame to the corresponding ideal normalized image coordinates [x, y, z] in the camera centered frame, and then to the projective coordinates [u, v] on the image plane up to scale factor s through the camera intrinsic matrix K. Here, the matrix K is an upper triangle matrix consisting the intrinsic parameters of the camera, including the focal length ($f_x$ and $f_y$) which defines as the distance from the camera center to the image plane, and the principal point ($c_x$, $c_y$) which defines as the intersection of the principal axis and the image plane.

$$s\begin{bmatrix}u\\v\\1\end{bmatrix} = K\begin{bmatrix}x\\y\\z\end{bmatrix} = K\left(R\begin{bmatrix}X\\Y\\Z\end{bmatrix}+t\right) = \begin{bmatrix}f_x & 0 & c_x\\0 & f_y & c_y\\0 & 0 & 1\end{bmatrix}\left(R\begin{bmatrix}X\\Y\\Z\end{bmatrix}+t\right) \quad \text{(Eq. 1)}$$

Since the world frame can be chosen arbitrarily, the XY-plane can be aligned with the calibration board 130, 255 plane, thus all the corners of the calibration board 130, 255 have all zero Z-coordinates. The projective model in Eq. 1 can be simplified as in Eq. 2, and $r_1$, $r_2$ are the corresponding first two columns in the rotation matrix R. Here, a homography matrix H can be used to represent the mapping between the checkerboard plane and its projective image. Based on the constraints of orthogonal unit vectors $r_1$ and $r_2$, both the camera intrinsic matrix K and the 6 dof extrinsic parameters can be recovered from the homography matrix H. In practice, this recovered result is merely a rough initial guess and should be refined through a maximum likelihood inference. Given a set of checkerboard images and the known pattern of the checkerboard plane and assuming the corresponding image measurements are corrupted by independent and identically distributed noises, the maximum likelihood estimate can be obtained by minimizing the aforementioned sum of squared differences between the target image coordinates and the computed coordinates from the projective transformation. With the help of the Levenberg-Marquardt algorithm, the camera's intrinsic and extrinsic parameters are iteratively optimized.

$$s\begin{bmatrix}u\\v\\1\end{bmatrix} = K\begin{bmatrix}x\\y\\z\end{bmatrix} = \quad \text{(Eq. 2)}$$

$$K\left([r_1\ r_2\ r_3]\begin{bmatrix}X\\Y\\0\end{bmatrix}+t\right) = K[r_1\ r_2\ t]\begin{bmatrix}X\\Y\\1\end{bmatrix} = H\begin{bmatrix}X\\Y\\1\end{bmatrix}$$

$$\xrightarrow{\text{Projection Model}} x' = \frac{x}{z}, \text{ and } y' = \frac{y}{z} \xrightarrow{\text{Apply Lens Distion}}$$

$$x'' = x'(1 + k_1 r^2 + k_2 r^4) + 2p_1 x' y' + p_2(r^2 + 2x'^2) \quad \text{(Eq. 2a)}$$

$$y'' = y'(1 + k_1 r^2 + k_2 r^4) + p_1(r^2 + 2y'^2) + 2p_2 x' y' \quad \text{(Eq. 2b)}$$

where $r^2 = x'^2 + y'^2$ $$u = f_x * x'' + c_x \quad \text{(Eq. 3a)}$$

$$v = f_z * y'' + c_y \quad \text{(Eq. 3b)}$$

Additionally, the lens can introduce some distortions to this ideal camera projective transformation as shown in Eq. 2 and 3. Typically there are two types of distortion effects: the radial distortion represented by coefficients $[k_1, k_2]$, and the tangential distortion represented by coefficients $[p_1, p_2]$. Applying these lens distortion effects to the ideal normalized image coordinates [x, y], the above lens distortion model in Eq. 2a and 2b can be obtained. Finally, the distorted normalized image coordinates can be converted to the image points as shown in Eq. 3a and 3b through the camera intrinsic parameters. Since the lens distortion effect are expected to be small, one can assume an initial guess of all zeros and refine these lens distortion parameters based on the maximum likelihood inference as described above. Once the lens distortion parameters are optimized, they are expected to be fixed and can be used throughout the application to remove the distortion effects in each image.

In order to determine the orientation of the image sensor 125 relative to the ground, the user device 120 may be oriented substantially parallel relative to a plane defined by the calibration board 130, 255. However, the orientation of the user device 120 may exhibit a small tilt angle from vertical (and/or, correspondingly, the field of view of the image sensor 125 might have a small tilt angle) and this small angle of tilt can cause systematic error in the calculated orientations of the one or more targets 260a-260h. In some embodiments, the systematic error may be compensated for by obtaining a reading from the accelerometer of the mobile communication device to determine the angle of tilt of the image sensor 125 to the ground. The tilt angle may then be applied to correct the orientation of the calculated reference points captured in the image taken by the camera.

Once calibration of the image sensor 125 has been completed, target data may be captured via the image sensor 125. Target data may be collected, for example, by capturing images of the one or more targets 115, 260a-h, 300A, 300B and/or calibration board 130, 255. In some embodiments, a user of the user device 120 may position the user device 120 such that the entire machine 105, 200 is in the frame of the image sensor 125 (e.g., the entire machine 105, 200 is captured in an image taken by the image sensor 125). In some embodiments, the user device 120 and/or image sensor 125 may be positioned approximately centered in front of the calibration board 130, 255. The user device 120 and/or measure-up logic may further be configured to prompt the user to record images while walking approximately 2 meters along the length of the machine 105, 200. For example, the machine 105, 200 may include a first axis (x-axis) running longitudinally along the length of the machine 105, 200, a second axis (y-axis) running vertically along a height dimension of the machine 105, 200, and a third axis (z-axis) running orthogonal to the x-axis and y-axis. Thus, in some embodiments, the x-axis and y-axis may define a plane in physical space that is substantially parallel (e.g., within 10 degrees of angular deviation) from an image plane captured by the image sensor 125. The z-axis may be orthogonal to the image plane. Accordingly, in some embodiments, the user may be prompted by the user device 120 to move approximately 2 meters along the x-axis. The user device 120 and/or measure-up logic may be configured to automatically capture one or more images of the machine 105, 200 as the user walks along the x-axis. In various embodiments, the series of images captured by the image sensor 125 while the user moves along the length (e.g., x-axis) of the machine may be used to create a stereo view of the machine 105, 200 and calculate measurements between reference features (e.g., the lengths of the boom and stick, linkage measurements, lengths between pins 225-250 and/or targets 260a-260h). In some further embodiments, IMU data from the user device 120 may further be used to calculate the distance between images. For example, in some embodiments, the IMU data may indicate a distance between the position of the user device 120 when a first image was captured and the position of the user device 120 when a second image was captured. Thus, in accordance with some embodiments, the one or more reference features 110, to which one or more respective targets 260a-h have been coupled, may be tracked based on images captured by the image sensor 125.

Figure 4:
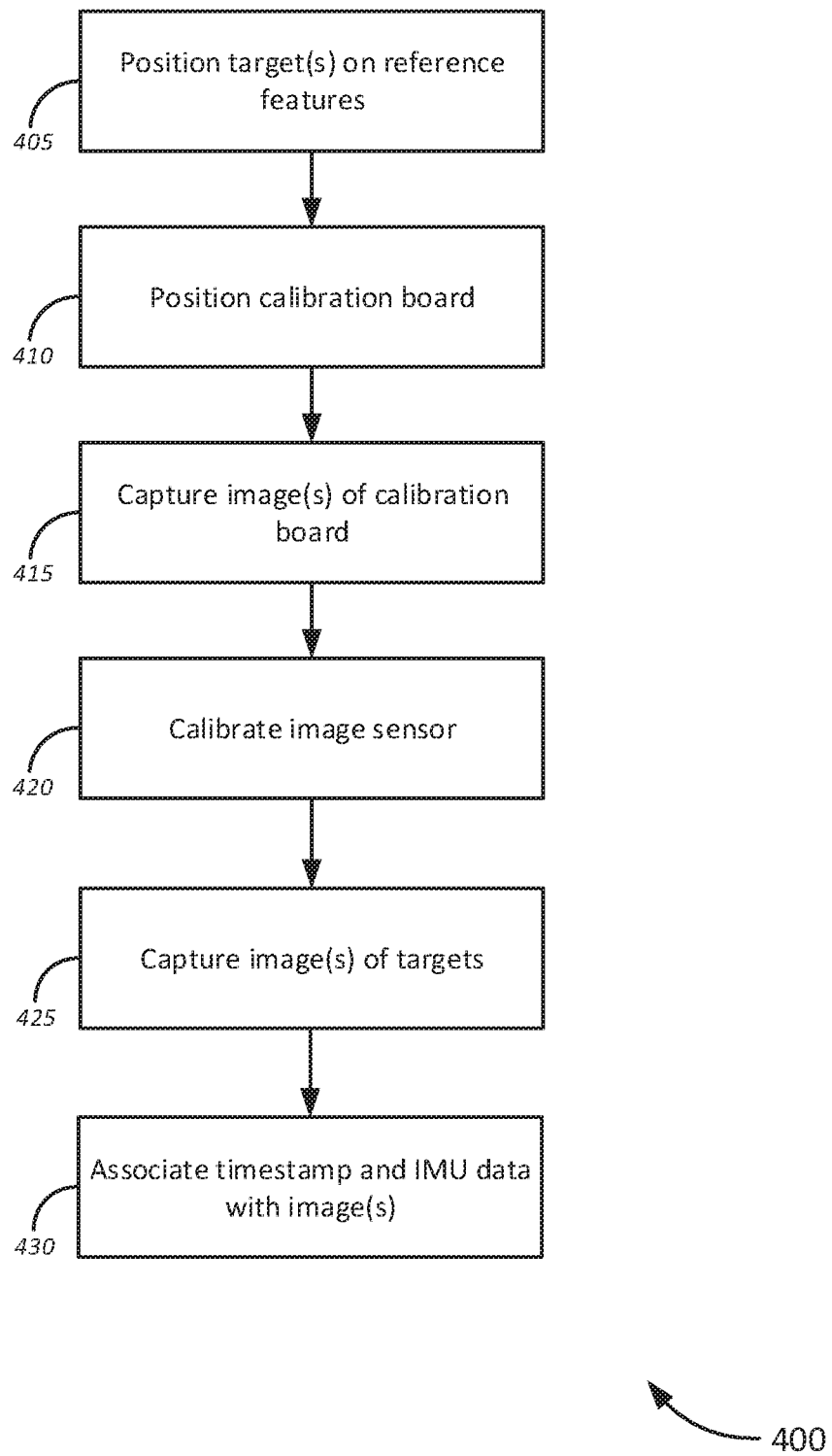
FIG. 4 is a flow diagram of a method for photogrammetric machine measure-up, in accordance with various embodiments.

FIG. 4 is a flow diagram of a method 400 for calibration and data capture for photogrammetric machine measure-up, in accordance with various embodiments. The method 400 begins, at block 405, by positioning one or more targets on respective reference features of a machine to be measured. As previously described, the reference features may include one or more pins (e.g., linkage pins) or surfaces of the machine. The machine may further include, for example, grading equipment such as an excavator. The one or more features may further include linkage pins, as previously described.

The method 400 continues, at block 410, by positioning of the calibration board on the machine being measured. The calibration board may be positioned so as to allow images of the calibration board to be captured for calibration purposes. In some embodiments, the calibration board may be positioned against the cabin, tracks, boom, or other part of the machine being measured. In some embodiments, the calibration board may be positioned to be stood vertically (e.g., orthogonal) relative to a horizontal axis defined by the ground. In further embodiments, the calibration board may be positioned such that a longitudinal axis of the calibration board is roughly parallel to a longitudinal axis of the boom of the machine.

At block 415, the one or more images of the calibration board are captured. In various embodiments, a user may capture images of the calibration board via a user device, such as a smartphone, tablet, or computer having a camera and/or image sensor. Images of the calibration board may be taken from various angles, including, without limitation, from the left and right, and from below and above the calibration board. In some embodiments, a user may move the user device in a circular motion around the calibration board, and a measure-up logic may be configured to cause the user device to capture images of the calibration board from the various angles automatically.

At block 420, based on the one or more images of the calibration board, the image sensor of the user device may be calibrated. As previously described, image sensor calibration may include, in one example, OpenCV calibration of the image sensor. Open CV calibration may include establishing a pinhole camera projection model configured to map pixels in an image frame to a physical world reference frame.

At block 425, images of the one or more targets are captured. As previously described, in some embodiments, a user of the user device may be prompted to move approximately 2 meters along the length of the machine. For example, in some embodiments, the series of images captured by the image sensor and/or camera may be used to create a stereo view of the machine, from which measurements between linkage pins or other reference features may be calculated.

At block 430, the method 400 may continue by associating one or more of timestamps and IMU data with each of the respective captured target images. For example, in some embodiments, IMU data from the user device may be used to calculate the distance between images. Thus, IMU data from the user device may be recorded over time. Each of the images may further be associated with a respective timestamp indicative of when the respective image was taken. Thus, in some embodiments, a distance between the position of the user device when a first image was captured and a position of the user device when the second image was captured may be determined.

Figure 5:
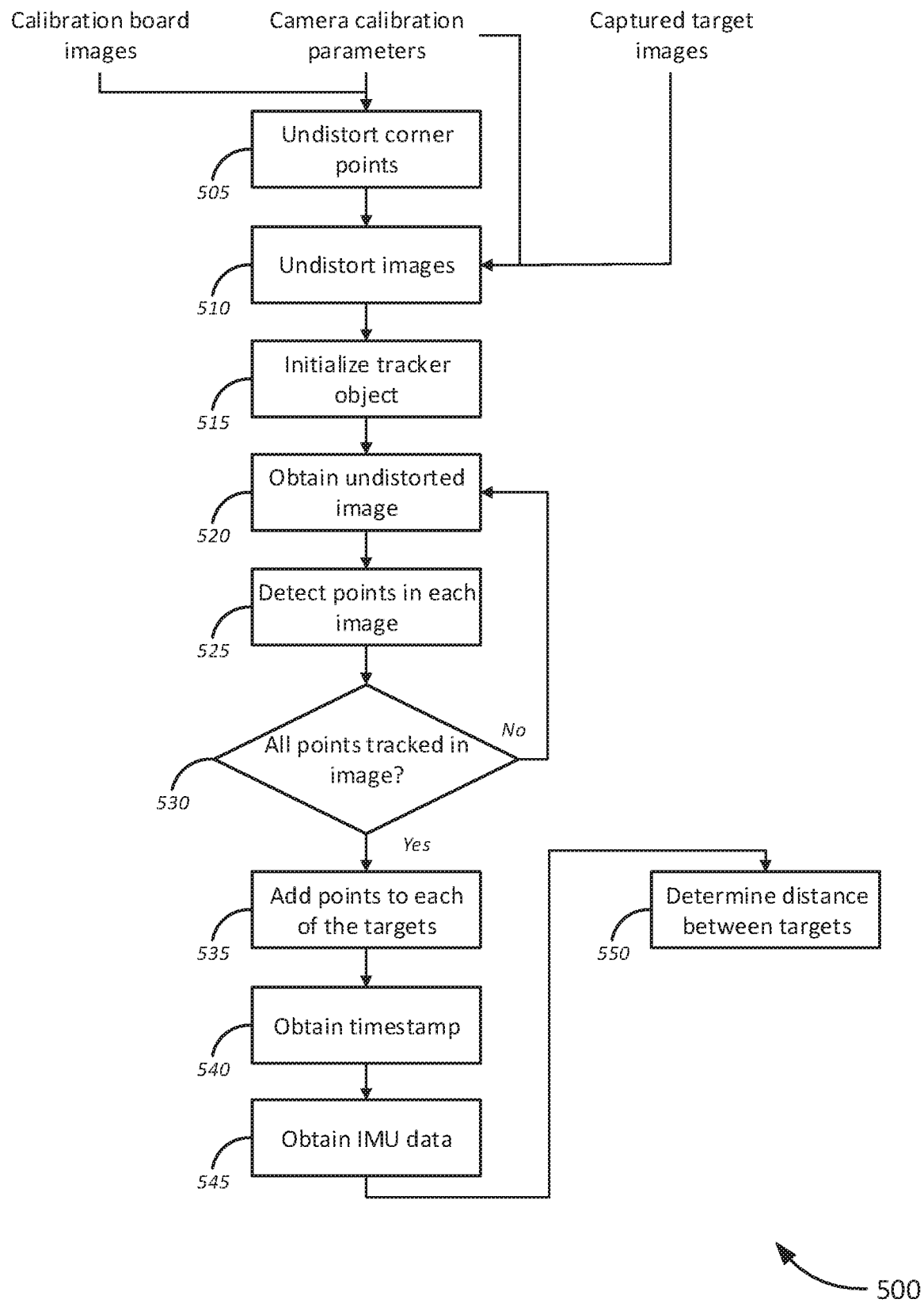
FIG. 5 is a flow diagram of a method for photogrammetric machine measure-up, in accordance with various embodiments.

FIG. 5 is a flow diagram of a method 500 for a photogrammetric machine measure-up workflow, in accordance with various embodiments. The method 500 may begin, at block 505, by undistorting the corner points of an image and/or image sensor. As previously described, the corner points may be undistorted based on an OpenCV image sensor calibration. In some embodiments, the measure-up logic may be configured to determine camera calibration parameters based on one or more images of a calibration board. Based on the calibration board images and camera calibration parameters. Camera calibration parameters may include parameters to correct for image distortion, camera position, lens characteristics, deviations of the optical axis (e.g., optical center) and pixel skew. Thus, camera calibration parameters may include, without limitation, image rotation, translation, focal length, optical axis offsets, and skew coefficient.

At block 510, the method 500 continues by undistorting the one or more images. In some embodiments, each of the one or more captured target images may be undistorted based on the camera calibration parameters previously obtained. Once the corner points and captured target images are undistorted, the method 500 may continue, at block 515, by initializing a tracker object. A tracker object may include, without limitation, an object to be tracked in the one or more captured images. In some embodiments, the tracker object may be tracked via a Kanade-Lucas-Tomasi (KLT) feature-tracking algorithm. Accordingly, in some embodiments, a tracker object may include one or more points in an image to be tracked by the measure-up logic. The one or more points may, in some embodiments, may correspond to pixels or groups of pixels as automatically detected via KLT feature-tracking. In further embodiments, the one or more points may correspond to the one or more reference features of the machine being measured, such as, for example, one or more linkage pins.

At block 520, an undistorted image is obtained by the measure-up logic. The measure-up logic may then, at block 525, detect one or more points in the image to be tracked. The one or more points to be tracked may be detected in the undistorted image. At decision block 530, it is determined whether all points being tracked are present in the image. If all points being tracked are not present in the image, the method 500 may obtain a subsequent undistorted image, as shown at block 520. If it is determined that all points being tracked are present in the image, the method 500 continues, at block 535, by adding points to each of the targets in the undistorted target image. In some examples, one or more points for tracking may be added to each of the targets in the undistorted images. In some embodiments, the measure-up logic may automatically detect the targets and associated points to be tracked with the respective centers of each of the targets.

The method 500 continues, at block 540, by obtaining a respective timestamp associated with the undistorted image. At block 545, IMU data associated with the undistorted image. In some embodiments, for example, IMU data generated by the user device at the associated time stamp may be determined. In other embodiments, IMU data may be recorded and associated with the respective image when the image is taken.

At block 550, the method 500 continues by determining the distance between targets based on data from at least two images. As known to those skilled in the art, a distance from the image sensor to a point of interest in an image may be determined from a pair of stereoscopic images. Specifically, the images allow the distance between the image sensors/cameras and a specific object/point within the image to be determined. In some examples, distances may be determined based on geometric relationships between the distance between the image sensors/cameras and a respective horizontal angle of view of each of the cameras to the object/point (e.g., the angle between an optical axis of the camera and the object in the image). Accordingly, in some embodiments, the distance between the first position of the image sensor when a first image was taken, and the second position of the image sensor in a second image may be determined based on the associated IMU data and/or timestamps. In some embodiments, distances between points (e.g., targets)/reference features (e.g., pins) may further be determined based on the geometric relationships between the distance between the image sensors and the respective horizontal angles of view to each of the respective points/reference features. In some further embodiments, a gyroscope may further be used to determine a rotation angle from a first position where a first image is captured to a second position where a second image is captured. The rotation angle may be calculated from gyroscope readings over this interval of movement (i.e., movement from the first position to the second position). In some embodiments, errors and/or differences in the respective optical axes of the user device and/or camera may be corrected based on data from the gyroscope and/or IMU.

Figure 6:
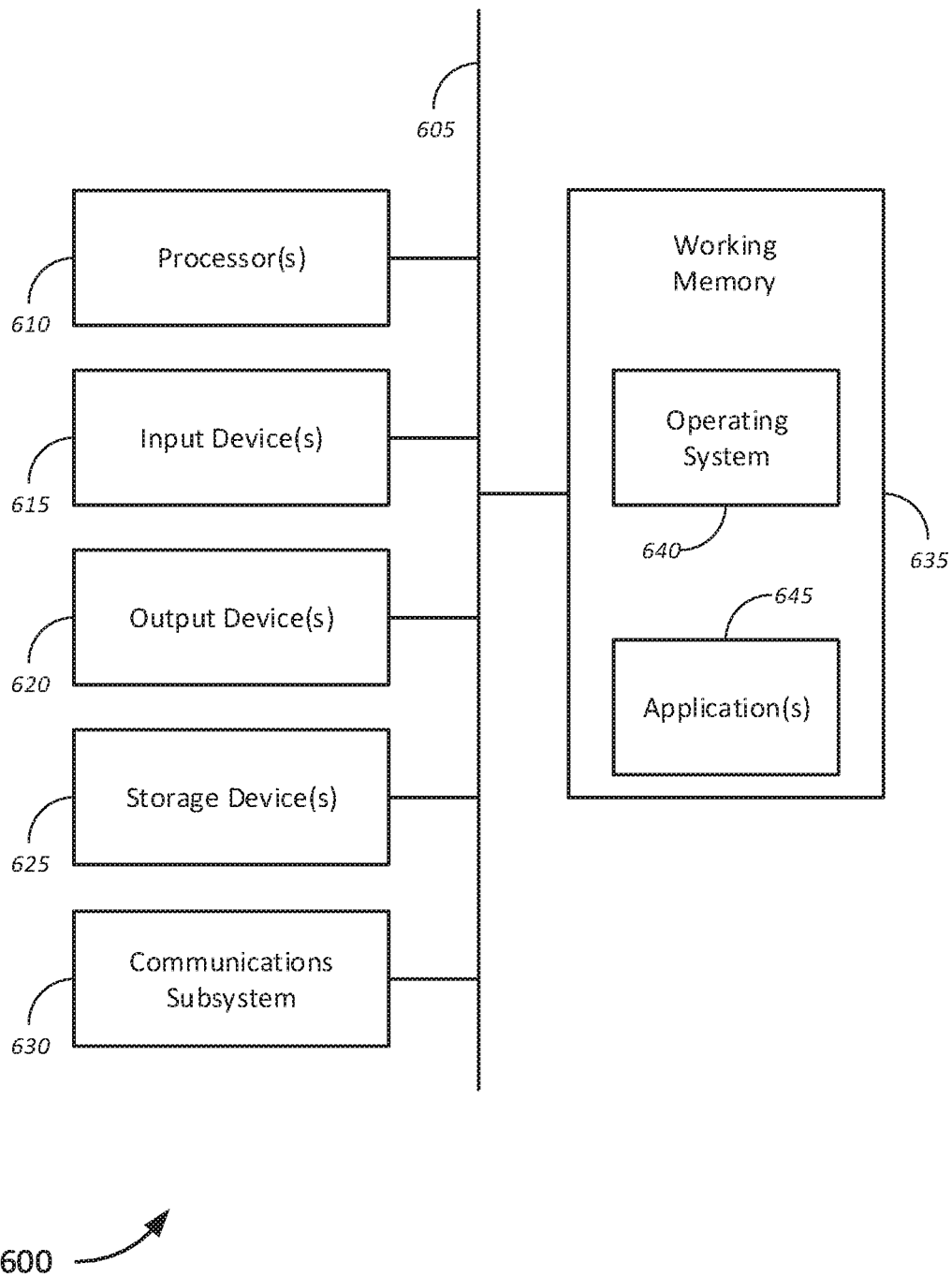
FIG. 6 is a schematic block diagram of a computer system for photogrammetric machine measure-up, in accordance with various embodiments.

FIG. 6 is a schematic block diagram of a computer system 600 for photogrammetric machine measure-up, in accordance with various embodiments. The computer system 600 is a schematic illustration of a computer system (physical and/or virtual), such as a user device or server, which may perform the methods provided by various other embodiments, as described herein. It should be noted that FIG. 6 only provides a generalized illustration of various components, of which one or more of each may be utilized as appropriate. FIG. 6, therefore, broadly illustrates how individual system elements may be implemented in a relatively separated or relatively more integrated manner.

The computer system 600 includes multiple hardware (or virtualized) elements that may be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and microcontrollers); one or more input devices 615, which include, without limitation, a mouse, a keyboard, one or more sensors, and/or the like; and one or more output devices 620, which can include, without limitation, a display device, and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 600 may also include a communications subsystem 630, which may include, without limitation, a modem, a network card (wireless or wired), an IR communication device, a wireless communication device and/or chip set (such as a Bluetooth™ device, an 802.11 device, a WiFi device, a WiMax device, a WWAN device, a low-power (LP) wireless device, a Z-Wave device, a ZigBee device, cellular communication facilities, etc.). The communications subsystem 630 may permit data to be exchanged with a network (such as the network described below, to name one example), with other computer or hardware systems, between data centers or different cloud platforms, and/or with any other devices described herein. In many embodiments, the computer system 600 further comprises a working memory 635, which can include a RAM or ROM device, as described above.

The computer system 600 also may comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code may be encoded and/or stored on a non-transitory computer readable storage medium, such as the storage device(s) 625 described above. In some cases, the storage medium may be incorporated within a computer system, such as the system 600. In other embodiments, the storage medium may be separate from a computer system (i.e., a removable medium, such as a compact disc, etc.), and/or provided in an installation package, such that the storage medium can be used to program, configure, and/or adapt a general purpose computer with the instructions/code stored thereon. These instructions may take the form of executable code, which is executable by the computer system 600 and/or may take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, and SoCs) may also be used, and/or particular elements may be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 600) to perform methods in accordance with various embodiments of the invention. According to a set of embodiments, some or all of the procedures of such methods are performed by the computer system 600 in response to processor 610 executing one or more sequences of one or more instructions (which may be incorporated into the operating system 640 and/or other code, such as an application program 645 or firmware) contained in the working memory 635. Such instructions may be read into the working memory 635 from another computer readable medium, such as one or more of the storage device(s) 625. Merely by way of example, execution of the sequences of instructions contained in the working memory 635 may cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer system 600, various computer readable media may be involved in providing instructions/code to processor(s) 610 for execution and/or may be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer may load the instructions into its dynamic memory and send the instructions as signals over a transmission medium to be received and/or executed by the computer system 600. These signals, which may be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally receives the signals, and the bus 605 then may carry the signals (and/or the data, instructions, etc. carried by the signals) to the working memory 635, from which the processor(s) 610 retrieves and executes the instructions. The instructions received by the working memory 635 may optionally be stored on a storage device 625 either before or after execution by the processor(s) 610.

Figure 7:
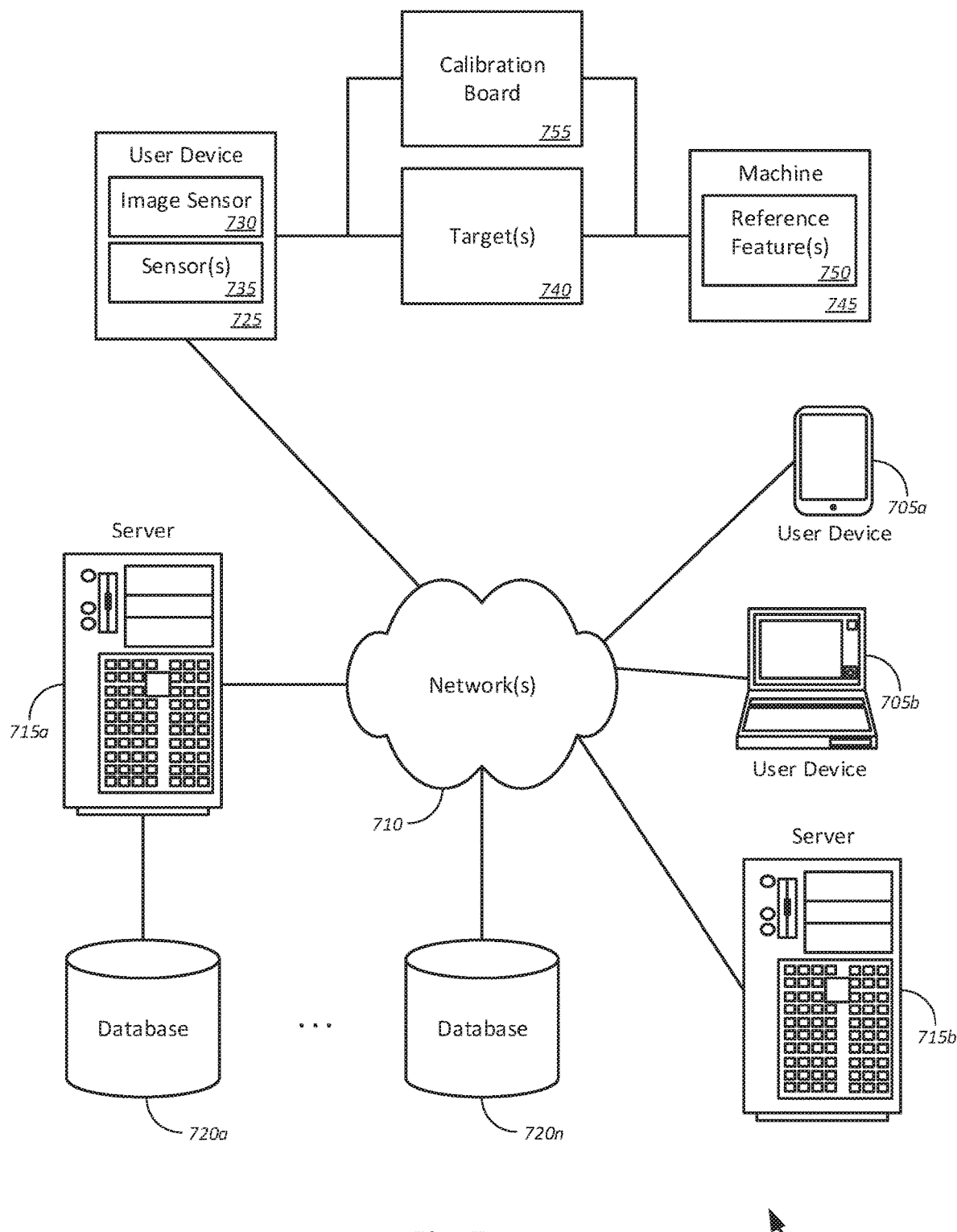
FIG. 7 is a schematic block diagram illustrating system of networked computer devices.

FIG. 7 is a schematic block diagram illustrating system of networked computer devices, in accordance with various embodiments. The system 700 may include one or more user devices 705. A user device 705 may include, merely by way of example, desktop computers, single-board computers, tablet computers, laptop computers, handheld computers, edge devices, and the like, running an appropriate operating system. User devices 705 may further include external devices, remote devices, servers, and/or workstation computers running any of a variety of operating systems. A user device 705 may also have any of a variety of applications, including one or more applications configured to perform methods provided by various embodiments, as well as one or more office applications, database client and/or server applications, and/or web browser applications. Alternatively, a user device 705 may include any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user devices 705a-705b, any number of user devices 705 may be supported.

Certain embodiments operate in a networked environment, which can include a network(s) 710. The network(s) 710 can be any type of network familiar to those skilled in the art that can support data communications, such as an access network, core network, or cloud network, and use any of a variety of commercially-available (and/or free or proprietary) protocols, including, without limitation, MQTT, CoAP, AMQP, STOMP, DDS, SCADA, XMPP, custom middleware agents, Modbus, BACnet, NCTIP, Bluetooth, Zigbee/Z-wave, TCP/IP, SNA™, IPX™, and the like. Merely by way of example, the network(s) 710 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network may include an access network of the service provider (e.g., an Internet service provider ("ISP")). In another embodiment, the network may include a core network of the service provider, backbone network, cloud network, management network, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 may be a data server, a web server, orchestration server, authentication server (e.g., TACACS, RADIUS, etc.), cloud computing device(s), or the like, as described above. The data server may include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, may include one or more application servers, which can be configured with one or more applications, programs, web-based services, or other network resources accessible by a client. Merely by way of example, the server(s) 715 can be one or more general purpose computers capable of executing programs or scripts in response to the user computers 705 and/or other servers 715, including, without limitation, web applications (which may, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a-720n (collectively, "databases 720"). The location of each of the databases 720 is discretionary: merely by way of example, a database 720a may reside on a storage medium local to (and/or resident in) a server 715a (or alternatively, user device 705). Alternatively, a database 720n can be remote so long as it can be in communication (e.g., via the network 710) with one or more of these. In a particular set of embodiments, a database 720 can reside in a storage-area network ("SAN") familiar to those skilled in the art. In one set of embodiments, the database 720 may be a relational database configured to host one or more data lakes collected from various data sources. The databases 720 may include SQL, no-SQL, and/or hybrid databases, as known to those in the art. The database may be controlled and/or maintained by a database server.

The system 700 may further include a user device 725 comprising an image sensor 730 and one or more sensors 735, one or more targets 740, and a machine 745 comprising one or more reference features 750, and a calibration board 755. The one or more sensors 735 may include, for example, one or more of an IMU and gyroscope. The one or more reference features may include, without limitation, linkage pins, hinges, joints, surfaces, mechanical couplings, edges, or other features of the machine 745 to which the one or more targets 740 may be coupled.

As previously described, the image sensor 730/user device 725 may be configured to obtain one or more images of the calibration board 755 and calibrate the image sensor 730 based on the one or more images of the calibration board 755. In some examples, calibration may include, without limitation, an OpenCV calibration of the image sensor 730. Once calibrated, the image sensor 730/user device 725 may be configured to capture one or more captured target images of the one or more targets 740. The user device 725 and/or a server, such as servers 715a-715b may comprise measure-up logic, and further be configured to determine one or more measurements of the machine 745. For example, in some embodiments, the measure-up logic may be configured to determine distances between the one or more reference features and/or targets based on the one or more captured target images, as previously described.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to certain structural and/or functional components for ease of description, methods provided by various embodiments are not limited to any single structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in sequentially for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a specific structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to one embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
a machine comprising two or more reference features;
two or more targets coupled to the two or more reference features;
a calibration board coupled to the machine;
a user device further comprising:
an image sensor;
an accelerometer;
a processor; and
a computer readable medium in communication with the processor, the computer readable medium having encoded thereon a set of instructions executable by the processor to:
capture, via the image sensor, one or more calibration images of the calibration board;
calibrate the image sensor based on the one or more calibration images, wherein calibrating the image sensor includes determining at least one camera calibration parameter;
capture, via the image sensor, two or more target images of each of the two or more targets;
associate each of the two or more target images with a respective time stamp when each respective target image of the two or more images was taken;
associate each of the two or more target images with respective accelerometer data from the respective time stamp when each respective target image of the two or more images was taken;
undistort each of the two or more target images based on the at least one camera calibration parameter;
detect each of the two or more targets in a first target image of the two or more target images;
detect each of the two or more targets in a second target image of the two or more target images; and
determine a measurement between two of the two or more reference features of the machine based, at least in part, on a first time stamp associated with when the first target image was captured and a second time stamp associated with when the second target image was captured.

2. The system of claim 1, wherein the user device further comprises a gyroscope, wherein calibrating the image sensor further includes determining, via the gyroscope, an orientation of the image sensor when the one or more calibration images was taken, wherein determining at least one calibration parameter is based, at least in part, on the orientation of the image sensor.

3. The system of claim 1, wherein the at least one camera calibration parameter includes one or more of a rotation, translation, optical axis offset, or skew coefficient.

4. The system of claim 1, wherein the machine is an excavator.

5. The system of claim 4, wherein the two or more reference features includes two or more linkage pins, the two or more linkage pins including a first linkage pin coupling a boom of the excavator to a cabin of the excavator, a second linkage pin coupling the boom to a stick of the excavator, and a third linkage pin coupling a bucket of the excavator to the stick.

6. The system of claim 1, wherein each of the two or more targets comprises one of a magnetic, adhesive, or mechanical coupling configured to couple the two or more targets a respective reference feature of the two or more reference features.

7. The system of claim 1, wherein each of the two or more targets comprises an offset post, wherein the offset post is configured to have an adjustable length.

8. The system of claim 1, wherein the set of instructions are further executable by the user device to:
determine, via the accelerometer, that the user device is moving;
obtain accelerometer data during movement of the user device between when the first target image and the second target image are captured;
determine a distance between a first position of the image sensor when the first target image was captured and a second position of the image sensor when the second target image was captured based, at least in part, on the accelerometer data;
determine, based at least in part on the distance between the first position of the image sensor when the first target image was captured and the second position of the image sensor when the second target image was captured, the distance between two of the two or more reference features of the machine.

9. The system of claim 1, wherein the one or more calibration images are captured from an angle such that an optical axis is positioned to the left of the center of the calibration board, to the right of the center of the calibration board, above the center of the calibration board, and below the center of the calibration board in respective calibration images of the one or more calibration images.

10. The system of claim 1, wherein the two or more target images are captured as the image sensor is moved in a direction along a longitudinal axis of the machine.

11. An apparatus comprising:
a processor; and
a computer readable medium in communication with the processor, the computer readable medium having encoded thereon a set of instructions executable by the processor to:
capture, via an image sensor, one or more calibration images of a calibration board;
calibrate the image sensor based on the one or more calibration images, wherein calibrating the image sensor includes determining at least one camera calibration parameter;
capture, via the image sensor, two or more target images of each of two or more targets;
associate each of the two or more target images with a respective time stamp when each respective target image of the two or more images was taken;
associate each of the two or more target images with respective accelerometer data from the respective time stamp when each respective target image of the two or more images was taken;
undistort each of the two or more target images based on the at least one camera calibration parameter;
detect each of the two or more targets in a first target image of the two or more target images;
detect each of the two or more targets in a second target image of the two or more target images; and
determine a measurement between two of two or more reference features of a machine based, at least in part, on accelerometer data from a first time stamp associated with when the first target image was captured and accelerometer data from a second time stamp associated with when the second target image was captured.

12. The apparatus of claim 11, wherein calibrating the image sensor further includes determining, via a gyroscope, an orientation of the image sensor when the one or more calibration images was taken, wherein determining at least one calibration parameter is based, at least in part, on the orientation of the image sensor.

13. The apparatus of claim 11, wherein the at least one camera calibration parameter includes one or more of a rotation, translation, optical axis offset, or skew coefficient.

14. The apparatus of claim 11, wherein the two or more reference features includes two or more linkage pins, the two or more linkage pins including a first linkage pin coupling a boom of an excavator to a cabin of the excavator, a second linkage pin coupling the boom to a stick of the excavator, and a third linkage pin coupling a bucket of the excavator to the stick.

15. The apparatus of claim 11, wherein the set of instructions are further executable by the mobile device to:
determine, via an accelerometer, that the user device is moving;
obtain accelerometer data during movement of the user device between when the first target image and the second target image are captured;
determine a distance between a first position of the image sensor when the first target image was captured and a second position of the image sensor when the second target image was captured based, at least in part, on the accelerometer data;
determine, based at least in part on the distance between the first position of the image sensor when the first target image was captured and the second position of the image sensor when the second target image was captured, the distance between two of the two or more reference features of the machine.

16. The apparatus of claim 11, wherein the one or more calibration images are captured from an angle such that an optical axis is positioned to the left of the center of the calibration board, to the right of the center of the calibration board, above the center of the calibration board, and below the center of the calibration board in respective calibration images of the one or more calibration images.

17. The apparatus of claim 11, wherein the two or more target images are captured as the image sensor is moved in a direction along a longitudinal axis of the machine.

18. A method comprising:
capturing, via an image sensor, one or more calibration images of a calibration board;
calibrating the image sensor based on the one or more calibration images, wherein calibrating the image sensor includes determining at least one camera calibration parameter;
capturing, via the image sensor, two or more target images of each of two or more targets;
associating each of the two or more target images with a respective time stamp when each respective target image of the two or more images was taken;
associating each of the two or more target images with respective accelerometer data from the respective time stamp when each respective target image of the two or more images was taken;
undistorting each of the two or more target images based on the at least one camera calibration parameter;
detecting each of the two or more targets in a first target image of the two or more target images;
detecting each of the two or more targets in a second target image of the two or more target images; and
determining a measurement between two of two or more reference features of a machine based, at least in part, on accelerometer data from a first time stamp associated with when the first target image was captured and accelerometer data from a second time stamp associated with when the second target image was captured.

19. The method of claim 18, wherein calibrating the image sensor further includes determining, via a gyroscope, an orientation of the image sensor when the one or more calibration images was taken, wherein determining at least one calibration parameter is based, at least in part, on the orientation of the image sensor.

20. The method of claim 18, further comprising:
determining, via an accelerometer, that the user device is moving;
obtain accelerometer data during movement of the user device between when the first target image and the second target image are captured;
determine a distance between a first position of the image sensor when the first target image was captured and a second position of the image sensor when the second target image was captured based, at least in part, on the accelerometer data;

determine, based at least in part on the distance between the first position of the image sensor when the first target image was captured and the second position of the image sensor when the second target image was captured, the distance between two of the two or more reference features of the machine.

* * * * *